Oct. 28, 1969     F. M. CURTIN     3,474,726
AUTOMATIC DEEP FAT FRYING MACHINE
Filed Feb. 23, 1968     2 Sheets-Sheet 1
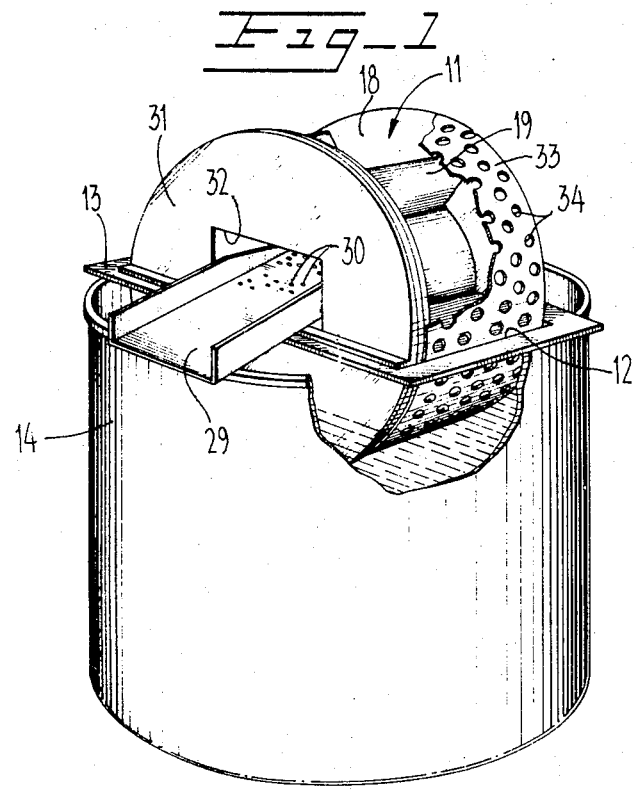
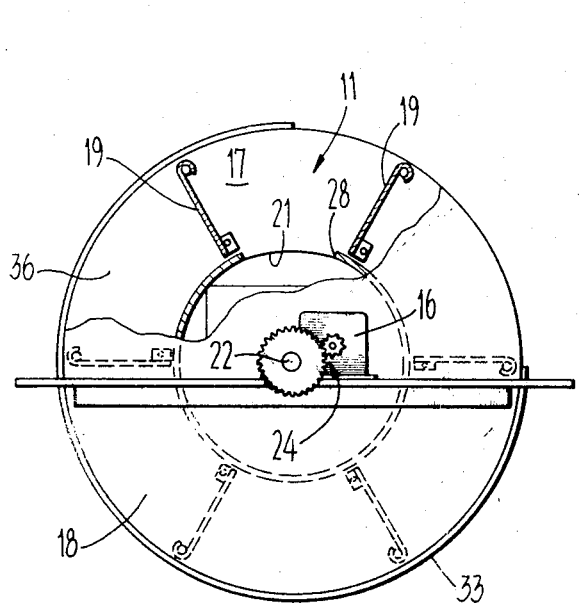
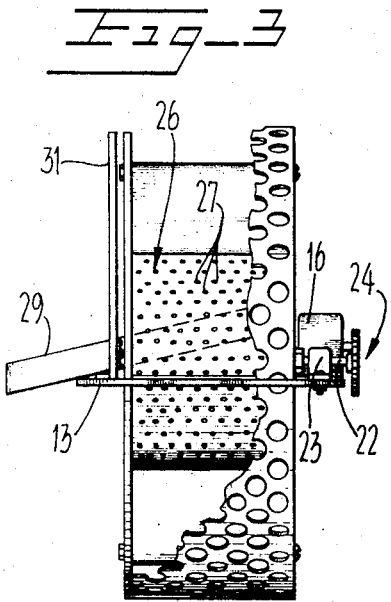
INVENTOR.
Frank M. Curtin
BY
ATTORNEYS Oct. 28, 1969  F. M. CURTIN  3,474,726
AUTOMATIC DEEP FAT FRYING MACHINE
Filed Feb. 23, 1968  2 Sheets-Sheet 2
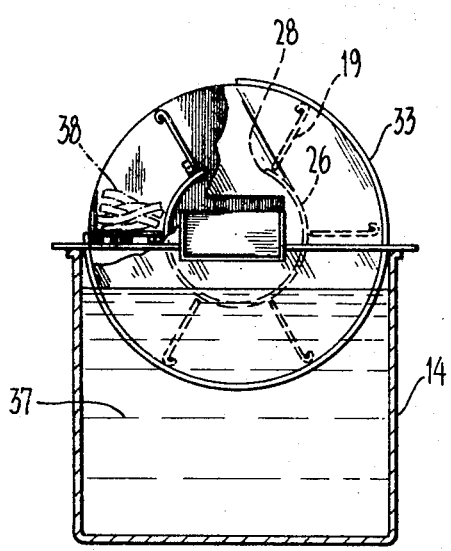
Fig_4
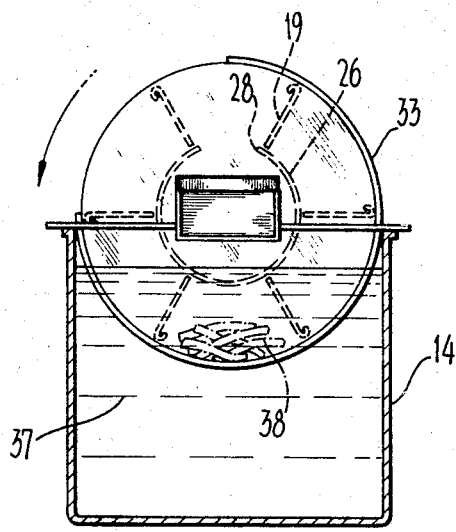
Fig_5
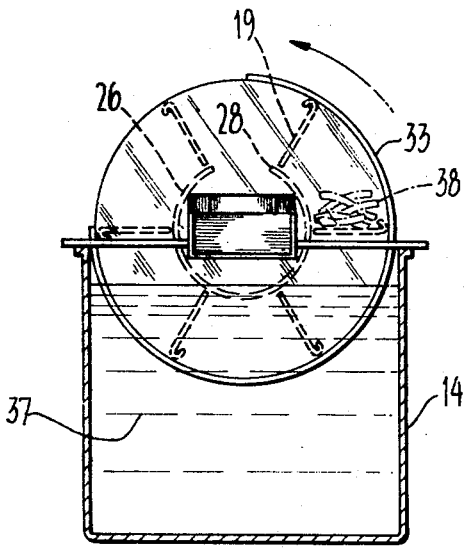
Fig_6
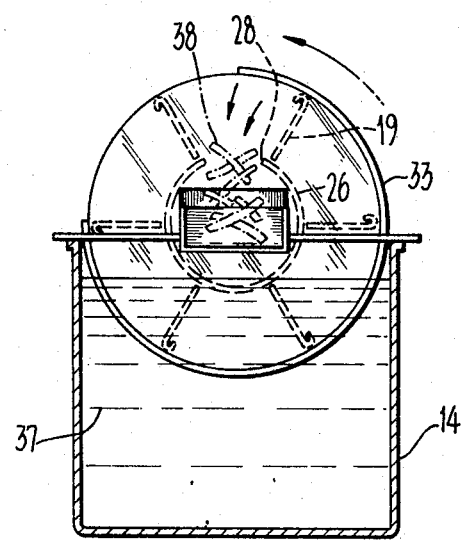
Fig_7
INVENTOR.
Frank M. Curtin
BY
Gardner & Zimmerman
ATTORNEYS United States Patent Office 3,474,726
Patented Oct. 28, 1969

1

3,474,726
AUTOMATIC DEEP FAT FRYING MACHINE
Frank M. Curtin, 16139 E. Placid Drive,
Whittier, Calif. 90604
Filed Feb. 23, 1968, Ser. No. 707,737
Int. Cl. A47j 37/12
U.S. Cl. 99—404     4 Claims

ABSTRACT OF THE DISCLOSURE

A machine for use with deep fat frying wells or equivalent vessels containing deep fat, which is capable of continuously and automatically producing deep fat fried food products of uniform quality. The machine is of relatively compact, simple, and economic construction while yet providing for precise cooking and drain intervals of the food product to insure uniform quality on a mass production basis. The machine is particularly suited to use in institutions, restaurants, schools, food processing plants, etc., where it is desirable to provide automatic cooking and quality control to eliminate possible human error.

BACKGROUND OF THE INVENTION

In the preparation of deep fat fried food products such as fish, french fried potatoes, potato chips, etc., it is the usual practice to place the product in a screened or perforate basket, submerge the basket in hot fat contained in a deep well, or equivalent vessel for a time interval suited to the cooking of the particular product, withdraw the basket from the deep fat and allow the excess fat to drain from the product, and dispense the deep fat fried product from the basket for consumption, or the like. The foregoing procedure is not, of course, particularly well suited to the mass production of the deep fat fried food product as is desired in the case of institutions, restaurants, schools, food processors, etc. Moreover, uniform quality of the deep fat fried product between prepared batches is virtually impossible to attain because the cooking and drain intervals of the respective batches are subject to human error and consequently not precise. In addition, substantial manipulation and surveillance of the food product is necessary in the preparation process.

SUMMARY OF THE INVENTION

The present invention is concerned with the automation of the deep fat frying of food products in order to provide quantity production thereof with uniform quality. More particularly, the present invention provides an automatic deep fat frying machine of relatively compact, simple, and economical construction which provides for precise constant cooking and drain intervals of the product to assure uniform quality thereof on a continuous mass production basis. The machine is easily adaptable to use with existing deep fat frying wells or equivalent deep fat containing vessels.

In the accomplishment of the foregoing, the deep fat frying machine of the present invention generally includes a drum conveyor, or equivalent means adapted to be rotatably mounted atop a deep well containing hot fat in a position such that the lower reach of conveyor travel extends beneath the surface of the fat. Fixed guide means are associated with the conveyor to define a conveyance passage for traversal by carriers of the conveyor extending beneath the surface of the fat along the major portion of the lower reach of conveyor travel and terminating in a discharge opening substantially centrally of the upper reach thereof. The opening communicates with an underlying discharge chute disposed centrally of the conveyor and extending therefrom transverse to the path of conveyor travel. A motor is coupled to the conveyor drum to

2 rotate same at a constant predetermined speed or to otherwise move the conveyor carriers along the path of conveyor travel at constant predetermined speed. Products to be deep fat fried delivered to the conveyor carries at the beginning of the lower reach of conveyor travel are consequently continuously moved by the carriers through the conveyance passage at constant speed to the discharge opening and thereat delivered to the chute for discharge from the conveyor. The time required for the carriers to move the products through the portion of the conveyance passage extending beneath the surface of the fat determines a constant precise cooking interval for the products, while the time required to move the products through the remainder of the passage to the discharge opening determines a constant precise drain interval, whereby uniformity of the deep fat fried product is assured. The cooking and drain intervals may be varied to suit different products by varying the speed of movement of the conveyor carriers.

BRIEF DESCRIPTION OF THE DRAWINGS

FIGURE 1 is a perspective view with portions broken-away of an automatic deep fat frying machine in accordance with the present invention.

FIGURE 2 is a rear elevational view with portions broken-away of the machine.

FIGURE 3 is a side elevational view with portions broken-away of the machine.

FIGURE 4 is a front view with portions broken-away of the machine depicting the loading cycle thereof.

FIGURE 5 is a view similar to FIGURE 4, but depicting the cooking cycle of the machine.

FIGURE 6 is a view similar to FIGURES 4 and 5, but depicting the drain cycle of the machine.

FIGURE 7 is a view similar to FIGURES 4–6, but depicting the discharge cycle of the machine.

DETAILED DESCRIPTION OF THE PREFERRED EMBODIMENT

As outlined hereinbefore, an automatic deep fat frying machine in accordance with the present invention basically includes a continuous conveyor having product carriers moved at constant speed along a continuous path of conveyor travel partially extending through a conveyance passage defined by suitable guide means. A portion of the conveyance passage is adapted to be submerged in hot fat contained within a deep well, or equivalent deep fat frying vessel, while the remainder of the passage is adapted to extend from the surface of the fat to a discharge means for delivering the product from the conveyor. The submerged portion of the passage defines a cooking zone, while the portion of the passage extending from the surface of the fat to the discharge means defines a drainage zone for draining any excess of hot fat from the product. Although the conveyor and conveyance passage may be variously provided, in the interests of compactness, simplicity, and economy of construction, the conveyor and guide means defining the conveyance passage are provided in the manner set forth hereinafter with reference to the preferred embodiment of the invention.

Referring now to FIGURES 1–3 in detail, the preferred embodiment of the automatic deep fat frying machine of the present invention will be seen to include a conveyor drum 11 disposed within a rectangular aperture 12 of a horizontal support plate 13 adapted to bridge the opposite sides of the rim of a deep fat frying well 14, or equivalent deep fat containing vessel, so as to be supported thereon. The drum is mounted for rotation about an axis extending transversely of the aperture and is rotated by a drive motor 16 coupled thereto and mounted upon the support plate. More particularly, the drum is preferably defined by a pair of transversely spaced coaxial circular discs 17, 18 transversely interconnected by a plurality of circumferentially spaced radial vanes 19 defining conveyor carriers. One disc 17 has as central circular aperture 21, for purposes subsequently described, and the vanes 19 extend radially outward from such aperture to the peripheries of the discs. The other disc 18 is coaxially secured to an end of a shaft 22 journalled for rotation in a bearing 23 mounted on the support plate 13 transversely adjacent the aperture 12. The drive shaft of motor 16 is coupled to the shaft 22 as by means of a gear drive 24. The carrier vanes 19 are thus moved along an annular path of travel having a lower reach beneath the plate 13 extending into the deep well 14, and an upper reach above the plate.

The guide means for defining the conveyance passage of the machine preferably includes an inner annular guide 26 coaxially disposed between the drum discs 17, 18 inwardly circumjacent the carrier vanes 19. The guide is provided with a plurality of perforations 27 and a central upper opening 28. Support of the guide in position is advantageously facilitated by means of a channel shaped dispensing chute 29 which extends freely through the aperture 21 of drum disc 17 and interiorly of the guide. The chute is inclined and underlies the opening 28 in upwardly facing relation thereto, and is preferably provided with a plurality of perforations 30. The guide is secured at several points as by welding to the side walls of the chute. The chute is in turn secured to the plate 13 and to a semicircular upright support element 31 mounted upon the plate and having a rectangular aperture 12 traversed by the chute.

The guide means further includes an outer guide 33 disposed outwardly circumjacent the drum discs 17 and 18 in transverse bridging relation thereto. The outer guide extends arcuately downward from one end of the aperture 12 of support plate 13 and upwardly through the opposite end of the aperture to terminate at a position overlying the center of the upper opening 28 of the inner guide 26, such outer guide being secured, as by welding, to the support plate at the opposite ends of the aperture 12. The outer guide thus circumscribes the drum discs 17, 18 along the entire lower reach of travel of the carrier vanes 19, as well as a portion of the upper reach of travel extending to the inner guide opening 28. The outer guide is provided with a plurality of perforations 34 to facilitate entry and drainage of hot fat or oil from the deep well 14.

It will be thus appreciated that the guides 26, 33 define an annular conveyance passage 36 traversed by the carrier vanes 19 which are moved at predetermined constant speed by drum rotation effected by the motor 16 and gear drive 24. A portion of the passage is submerged in hot fat or oil 37 contained in the deep well 14 (see FIGURES 4–7). The remaining portion of the passage extends from the surface of the fat upwardly to the inner guide opening 28 which communicates with the dispensing chute 29.

The operation of the deep fat frying machine is illustrated in FIGURES 4–7. FIGURE 4 depicts the loading cycle wherein the product 38 is loaded on or otherwise delivered to the carrier vanes 19 as they begin the lower reach of their travel and enter the conveyance passage 36. As the vanes are rotated along the lower reach of travel, the product is submerged in the hot fat 37, as indicated in FIGURE 5, and the cooking or frying cycle is conducted over a cooking interval determined by the time required for the vanes to be rotated through the fat. During the cooking cycle, the product becomes dehydrated and floats upward against the inner guide 26 and thus does not drag against the outer guide 33. When the vanes leave the lower reach of travel, a drain cycle is initiated as shown in FIGURE 6. More particularly, excess fat is drained from the product as the vanes are rotated along the portion of their upper reach encompassed by the guides 26, 33 extending to the inner guide opening 28. A drain interval is thus established which is determined by the time required for the vanes to be rotated from the surface of the fat to the opening 28, drainage being effected through the guide perforations 27, 34. As the vanes are moved over the guide opening 28 a discharge cycle is effected as depicted in FIGURE 7. The fried and drained product is discharged through the opening to the underlying chute 29 and is dispensed therefrom by gravity due to the inclination of the chute.

It will be thus appreciated that the automatic deep fat frying machine provides for the quantity production of deep fat fried products, it being possible to continuously deliver the product to the carrier vanes in the manner previously described relative to the loading cycle. Moreover, product uniformity is assured by virtue of the constant precise cooking and drain intervals effected during the cooking and drain cycles by the vanes moving along their path of travel at constant predetermined speed. The speed may be varied to provide cooking and drain intervals suited to different products by changing the ratio of the gear drive 24.

I claim:

1. An automatic deep fat frying machine for use with a deep well containing hot fat comprising a continuous conveyor having product carriers movable along a continuous path of travel having a portion adapted to extend through said fat, drive means coupled to said conveyor for moving said carriers along said path at a predetermined constant speed, guide means defining a conveyance passage encompassing said portion of said path adapted to extend through said fat and encompassing a portion of said fat, discharge means disposed in receiving relation to the end of said portion of said path adapted to extend away from the surface of said fat, said conveyor comprising a drum defined by a pair of coaxially spaced discs transversely interconnected by a plurality of circumferentially spaced radial vanes defining said carrier, and means for rotatably mounting said drum atop said deep well in a position wherein the lower reach of drum rotation extends beneath the surface of said fat, said drive means including a motor coupled to said drum to rotate same at constant speed, a first of said discs having a central circular aperture and said vanes extending radially outward from said aperture to the peripheries of said discs, and said guide means comprising a perforate inner annular guide coaxially disposed between said discs inwardly circumjacent said vanes, said inner guide having a central upper opening communicating with said discharge means, and a perforate outer guide disposed outwardly circumjacent said discs in transverse bridging relation thereto, said outer guide extending arcuately along said lower reach of drum rotation, and a portion of the upper reach of drum rotation extending to a position overlying said upper opening of said inner guide.

2. An automatic deep fat frying machine according to claim 1, further defined by said means for rotatably mounting said drum comprising a support plate adapted to bridge said deep well and be supported thereon, said plate having a rectangular aperture, said drum disposed in said aperture and mounted for rotation about an axis extending transversely thereof.

3. An automatic deep fat frying machine according to claim 2, further defined by said discharge means comprising an inclined chute of channel shaped configuration, said chute extending through said aperture of said first disc and underlying said opening of said inner guide in upwardly facing relation thereto, said inner guide secured to said chute, said chute secured to said plate, said outer guide extending from a first end of said aperture of said plate and arcuately through the second end of said aperture of said plate to terminate at a posititon overlying the center of said upper opening of said inner guide, said outer guide secured to said plate at said first and second ends of said aperture thereof.

4. An automatic deep fat frying machine according to claim 3, further defined by a shaft coaxially secured to the second of said discs, a bearing mounted on said plate journalling said shaft for rotation, said motor mounted on said plate, and a gear drive coupling said motor to said shaft in rotatable driving relation thereto.

References Cited

UNITED STATES PATENTS

| 757,186 | 4/1904 | Fancher | 99—404 |
| 3,022,722 | 2/1962 | Arvan | 99—404 |

ROBERT W. JENKINS, Primary Examiner